US010230111B2

(12) United States Patent
Yang et al.

(10) Patent No.: US 10,230,111 B2
(45) Date of Patent: Mar. 12, 2019

(54) GRAPHENE POWDER, ELECTRODE PASTE FOR LITHIUM ION BATTERY AND ELECTRODE FOR LITHIUM ION BATTERY

(71) Applicant: TORAY INDUSTRIES, INC., Tokyo (JP)

(72) Inventors: Hanxiao Yang, Otsu (JP); Eiichiro Tamaki, Otsu (JP); Yasuo Kubota, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 15/517,399

(22) PCT Filed: Oct. 6, 2015

(86) PCT No.: PCT/JP2015/078362
§ 371 (c)(1),
(2) Date: Apr. 6, 2017

(87) PCT Pub. No.: WO2016/056557
PCT Pub. Date: Apr. 14, 2016

(65) Prior Publication Data
US 2017/0346098 A1 Nov. 30, 2017

(30) Foreign Application Priority Data

Oct. 10, 2014 (JP) ................................ 2014-208590

(51) Int. Cl.
*H01M 4/583* (2010.01)
*B82Y 30/00* (2011.01)
*H01M 4/62* (2006.01)
*C01B 32/05* (2017.01)
*C01B 32/192* (2017.01)
*H01M 10/0525* (2010.01)
*B82Y 40/00* (2011.01)
*H01M 10/052* (2010.01)

(52) U.S. Cl.
CPC ............ *H01M 4/625* (2013.01); *C01B 32/05* (2017.08); *C01B 32/192* (2017.08); *H01M 10/0525* (2013.01); *B82Y 30/00* (2013.01); *B82Y 40/00* (2013.01); *C01B 2204/22* (2013.01); *C01B 2204/30* (2013.01); *C01B 2204/32* (2013.01); *C01P 2002/82* (2013.01); *H01M 10/052* (2013.01); *Y10S 977/734* (2013.01); *Y10S 977/842* (2013.01); *Y10S 977/948* (2013.01)

(58) Field of Classification Search
CPC . B82Y 30/00; H01B 1/04; H01B 1/24; H01M 4/625
USPC .............. 252/500, 502; 429/231.8
See application file for complete search history.

(56) References Cited

U.S. PATENT DOCUMENTS

| 8,891,247 | B2 | 11/2014 | Prud'Homme et al. |
| 8,926,935 | B2* | 1/2015 | Krishnaiah ............ B82Y 30/00 423/448 |
| 9,293,770 | B2 | 3/2016 | Todoriki et al. |
| 2012/0164539 | A1* | 6/2012 | Zhamu ................ H01M 4/0445 429/300 |
| 2012/0270960 | A1* | 10/2012 | Felisari .................. B82Y 30/00 521/90 |
| 2013/0230709 | A1 | 9/2013 | Zhou et al. |
| 2013/0302693 | A1 | 11/2013 | Sun et al. |
| 2014/0127568 | A1 | 5/2014 | Kawakami et al. |
| 2014/0161730 | A1* | 6/2014 | Sitharaman ............ B82Y 15/00 424/9.32 |
| 2015/0099214 | A1* | 4/2015 | Khe ........................ H01B 1/24 429/523 |
| 2015/0140438 | A1* | 5/2015 | Sun ....................... H01M 4/625 429/231.95 |

FOREIGN PATENT DOCUMENTS

| CN | 102569750 A | 7/2012 | |
| CN | 102730678 A | * 10/2012 | ........... C01B 32/192 |
| CN | 103191731 A | 7/2013 | |
| CN | 103402913 A | 11/2013 | |
| CN | 103708445 A | * 4/2014 | ............ C01B 31/04 |
| JP | 2009511415 A | 3/2009 | |
| JP | 2010129396 A | 6/2010 | |
| JP | 2014007141 A | 1/2014 | |
| JP | 2014507365 A | 3/2014 | |
| JP | 2014112540 A | 6/2014 | |
| KR | 20130077087 | * 7/2013 | ............... C08K 3/04 |
| WO | 2013181994 A1 | 12/2013 | |

OTHER PUBLICATIONS

Stankovich ("Synthesis of graphene-based nanosheets via chemical reduction of exfoliated graphite oxide." Carbon 45 (2007) 1558-1565) (Year: 2007).*
International Search Report and Written Opinion for International Application No. PCT/JP2015/078362, dated Dec. 28, 2015, 6 pages.

* cited by examiner

*Primary Examiner* — Tri V Nguyen
(74) *Attorney, Agent, or Firm* — RatnerPrestia

(57) ABSTRACT

The present invention relates to preparation of a highly dispersible graphene powder. Further, the present invention includes providing an electrode for a lithium ion battery having good output characteristics and cycle characteristics by utilizing a highly dispersible graphene powder. The present invention also includes providing a graphene powder having a specific surface area of 80 $m^2/g$ or more to 250 $m^2/g$ or less as measured by BET measurement, and an oxygen-to-carbon element ratio of 0.09 or more to 0.30 or less as measured by X-ray photoelectron spectroscopy.

11 Claims, No Drawings

GRAPHENE POWDER, ELECTRODE PASTE FOR LITHIUM ION BATTERY AND ELECTRODE FOR LITHIUM ION BATTERY

CROSS REFERENCE TO RELATED APPLICATIONS

This is the U.S. National Phase application of PCT/JP2015/078362, filed Oct. 6, 2015, and claims priority to Japanese Patent Application No. 2014-208590, filed Oct. 10, 2014, the disclosures of each of these applications being incorporated herein by reference in their entireties for all purposes.

FIELD OF THE INVENTION

The present invention relates to a graphene powder, and an electrode paste for a lithium ion battery containing the graphene powder and an electrode for a lithium ion battery containing the graphene powder.

BACKGROUND OF THE INVENTION

Graphene is a two-dimensional crystal composed of carbon atoms, and is a material that has been greatly attracting attention since being discovered in 2004. Graphene has excellent electrical, thermal, optical, and mechanical properties, and is expected to be applied in a wide range of battery materials, energy storage materials, electronic devices, composite materials, and the like.

In order to realize such an application of graphene, the efficiency in a preparation method for cost reduction, and the improvement of the dispersibility are essential issues.

As the production method of graphene, a mechanical exfoliation method, a chemical vapor deposition (CVD) method, a crystal epitaxial growth (CEG) method, and the like can be mentioned, but these methods have low productivity and are not suitable for mass production. On the other hand, an oxidation-reduction method (in which graphite oxide or graphene oxide is obtained by an oxidation treatment of natural graphite, and then graphene is prepared by a reduction reaction) can synthesize the graphene in a large amount, and is an extremely important technique for putting the graphene into practical use.

The graphene obtained as described above has high conductive performance and further has a thin flaky structure, and therefore, can increase the conductive path, and has high potential in particular as a conductive material for a battery. However, graphene is nanocarbon, and is easily aggregated. Even when prepared simply by an oxidation-reduction method, the graphene cannot be adequately dispersed and cannot exert the potential either.

Accordingly, in Patent Document 1, graphite oxide is expanded and exfoliated by heating, and flake graphite having a high specific surface area is prepared. In Patent Document 2, graphene oxide and an electrode active material for a lithium ion battery are mixed, and then the mixture is reduced by heating, and the resultant product is utilized as a conductive agent. In addition, in Patent Document 3, graphene is reduced in the presence of catechol, and highly dispersible graphene is prepared.

PATENT DOCUMENTS

Patent Document 1: Japanese Translation of PCT Application No. 2009-511415

Patent Document 2: Japanese Patent Laid-open Publication No. 2014-112540

Patent Document 3: WO 2013/181994 A

SUMMARY OF THE INVENTION

However, as in Patent Document 1, graphene prepared by thermal expansion has an excessively high specific surface area, and induces the aggregation, and therefore, the graphene cannot be favorably dispersed.

As in Patent Document 2, also in the technique of mixing graphene oxide with other particles and heating the mixture, as in the case of Patent Document 1, graphene is prepared by a heat treatment, and therefore the specific surface area is increased. Further, the oxygen ratio is decreased by the heating and the dispersibility is also decreased.

In addition, when a surface treatment agent is used as in Patent Document 3, although the dispersibility is increased, particles of the graphene oxide are stacked on each other, and the exfoliation state of a graphene powder after reduction becomes insufficient.

As a result of keen study, the present inventors have found that the graphene having both of an adequate specific surface area and an adequate oxidation degree can have high dispersibility and high ion conductivity with the thin shape.

That is, the present invention includes providing a graphene powder having a specific surface area of 80 $m^2/g$ or more to 250 $m^2/g$ or less as measured by BET measurement, and an oxygen-to-carbon element ratio of 0.09 or more to 0.30 or less as measured by X-ray photoelectron spectroscopy.

The graphene powder of the present invention has both of an adequate specific surface area and an adequate oxidation degree, and therefore has high dispersibility and high ion conductivity. As to a conductive agent, as the number per weight is larger and the dispersibility is higher, the conductive network can be more easily formed in a resin or in an electrode, and therefore the performance is higher. Accordingly, by forming a conductive network in an electrode matrix with the use of the graphene of the present invention together with a binder and an electrode active material, an electrode for a lithium ion battery having excellent discharge performance can be provided.

DETAILED DESCRIPTION OF EMBODIMENTS OF THE INVENTION

<Graphene Powder>

A graphene powder has a structure in which single layer graphene is laminated, and has a flaky form. The thickness of the graphene is not particularly limited, but is preferably 100 nm or less, more preferably 50 nm or less, and further preferably 20 nm or less. The size in a surface direction of the graphene is not particularly limited either, but is preferably 0.5 µm or more, more preferably 0.7 µm or more, and further preferably 1 µm or more as the lower limit, and is preferably 50 µm or less, more preferably 10 µm or less, and further preferably 5 µm or less as the upper limit. The size in a surface direction of the graphene as referred to herein means the average of the longest diameter and the shortest diameter of the graphene surface. Further, a surface treatment agent described later may be contained in the graphene powder.

The specific surface area of the graphene powder of an embodiment of the present invention as measured by BET measurement (hereinafter also simply referred to as "specific surface area") is 80 $m^2/g$ or more to 250 $m^2/g$ or less. The specific surface area of the graphene reflects the thickness and the exfoliation degree of the graphene. As the specific surface area is larger, the graphene is thinner and has higher exfoliation degree. When the specific surface area of the graphene is less than 80 m$^2$/g, the number of graphene particles per unit weight is small in a case where the graphene is mixed in an electrode or in a resin, and therefore, the conductive network is hardly formed. When the specific surface area of the graphene is larger than 250 m$^2$/g, particles of the graphene are easily aggregated each other, and the aggregate exists isolatedly in an electrode or in a resin, and therefore, the conductive network is hardly formed. The specific surface area of the graphene is preferably 100 m$^2$/g or more, and more preferably 130 m$^2$/g or more. Further, the specific surface area of the graphene is preferably 200 m$^2$/g or less, and more preferably 180 m$^2$/g or less. The BET measurement is performed in accordance with a method described in JIS Z8830: 2013. The measurement of the adsorption gas amount is measured by a carrier gas method, and the analysis of the adsorption data is performed by a one-point method.

The graphene powder in an embodiment of the present invention has an oxygen-to-carbon element ratio (O/C ratio) of 0.09 or more to 0.30 or less. Oxygen atoms in the graphene powder are the oxygen atoms contained in an acidic group bound to the graphene itself or contained in an acidic group that exists in a surface treatment agent adhered onto a surface of the graphene. Herein, the acidic group means a hydroxy group, a phenolic hydroxy group, a nitro group, a carboxyl group, or a carbonyl group, and these groups have an effect of improving the dispersion state of the graphene. When there are extremely few oxygen atoms in a graphene powder, the dispersibility of the graphene powder in a case of mixing the graphene powder into an electrode or into a resin is poor. Therefore, the O/C ratio is preferably 0.10 or more. Further, when there are extremely many oxygen atoms in a graphene powder, the graphene is in a state of not being sufficiently reduced, and the electrical conductivity is decreased. Therefore, the O/C ratio is preferably 0.20 or less, and more preferably 0.15 or less.

In the present invention, the O/C ratio is a value determined from the amounts of carbon atoms and oxygen atoms which are measured by X-ray photoelectron spectroscopy. In the X-ray photoelectron spectroscopy, a surface of a sample placed in ultrahigh vacuum is irradiated with soft X-rays, and the photoelectrons emitted from the surface of the sample are detected by an analyzer. By measuring the photoelectrons with wide scanning, and determining the bond energy value of bound electrons in a substance, elemental data of the substance can be obtained. Further, the O/C ratio of the graphene powder can be determined from peak areas of carbon atoms and oxygen atoms.

The O/C ratio can be controlled by changing the oxidation degree of the graphene oxide as a raw material, or by changing the amount of a surface treatment agent. The higher the oxidation degree of the graphene oxide is, the larger the amount of the remaining oxygen atoms after reduction is. When the oxidation degree is low, the amount of oxygen atoms after reduction is reduced. Further, by increasing the adhesion amount of a surface treatment agent that has an acidic group, the amount of oxygen atoms can be increased.

When the graphene powder of the present invention is in the range of specific surface area described above and the range of O/C ratio described above, the graphene powder has high exfoliation degree, and further has favorable dispersibility in an electrode or in a resin, and can form an ideal conductive network. In the graphene powder of the present invention, a nitrogen-to-carbon element ratio (N/C ratio) is preferably 0.005 or more to 0.02 or less. Nitrogen atoms in the graphene powder are the nitrogen atoms derived from a nitrogen-containing functional group such as an amino group and a nitro group contained in a surface treatment agent, or a heterocyclic compound containing nitrogen of a pyridine group or an imidazole group. When the element composition ratio of nitrogen atoms to carbon atoms exceeds 0.02, the nitrogen atoms replace the graphene conjugated structure, and therefore, the electrical conductivity is easily lowered. On the other hand, the surface treatment agent containing a nitrogen element particularly contributes to the graphene dispersibility in a solvent, and therefore is preferably present in a small amount. From the viewpoint described above, the N/C ratio is further preferably 0.01 or more to 0.015 or less. The N/C ratio is a value measured by X-ray photoelectron spectroscopy similarly to the O/C ratio.

It is preferred that the graphene powder of the present invention has some degree of structural defects from the point of improving the ion conductivity. When the graphene powder contains structural defects, ions can move through the structural defects, and therefore, the ion conductivity can be improved. When there are extremely few structural defects, ions cannot pass through the graphene layer in a direction perpendicular to the layer, and therefore, the ion conductivity is lowered. Further, when there are extremely many structural defects, the electrical conductivity is lowered.

The structural defects of the graphene powder can be measured by Raman spectroscopy. In a perfect graphite crystal, intrinsically a peak of $I_D$ does not appear, but as the symmetry of the graphite structure is lost, the peak intensity of $I_D$ is increased. Accordingly, as the structural defects of the graphene powder increase, the peak intensity ratio of $I_D/I_G$ ($I_D/I_G$ ratio) decreases. From the viewpoint of achieving a balance between the ion conductivity and the electrical conductivity, the $I_D/I_G$ ratio is preferably 1 or more to 2 or less, more preferably 1.3 or more to 1.8 or less, and further preferably 1.45 or more to 1.7 or less.

In addition, the peak intensity ratios of Raman measurement are all obtained by the measurement at an excitation wavelength of 514.5 nm using an argon ion laser as an excitation laser. In the Raman spectroscopy, the graphene powder has peaks in the vicinity of 1580 cm$^{-1}$ and in the vicinity of 1335 cm$^{-1}$. The peak intensity in the vicinity of 1580 cm$^{-1}$ is designated as $I_G$, and the peak intensity in the vicinity of 1335 cm$^{-1}$ is designated as $I_D$.

The powder resistivity of the graphene powder in the present invention is preferably 10$^{-3}$ Ω·cm or more to 10$^{-1}$ Ω·cm or less, and more preferably 1×10$^{-3}$ Ω·cm or more to 3×10$^{-2}$ Ω·cm or less. The powder resistivity correlates with the adhesion amount of a surface treatment agent. Accordingly, when the powder resistivity is less than 10$^{-3}$ Ω·cm, the adhesion amount of a surface treatment agent is insufficient and the dispersibility tends to be decreased. On the other hand, when the powder resistivity exceeds 10$^{-1}$ Ω·cm, there is a tendency that the electrical conductivity is lowered and the performance as a conductive agent is deteriorated.

<Electrode for Lithium Ion Battery>

The electrode for a lithium ion battery of an embodiment of the present invention contains a positive or negative electrode active material, and the graphene powder of the present invention as a conductive agent, and is typically an electrode in which a mixture layer containing an electrode active material, the graphene powder of the present invention, and a binder is formed on a collector.

The type of the collector is not limited as long as it is a sheet or mesh having electrical conductivity, and a collector of metal foil or metal mesh, which does not largely affect the electrochemical reaction, is used. As the collector on the positive side, a collector of aluminum foil or aluminum mesh is preferred. As the collector on the negative side, a collector of copper foil or copper mesh is preferred. In order to increase the electrode density, there may be pores in part of the metal foil.

The electrode active material is roughly classified into a positive electrode active material and a negative electrode active material. The graphene powder of the present invention can be utilized for either of the positive electrode active material and the negative electrode active material. The positive electrode active material is not particularly limited, and examples of the positive electrode active material include composite oxides of lithium and a transition metal, such as lithium cobaltate ($LiCoO_2$), lithium nickelate ($LiNiO_2$), spinel-type lithium manganate ($LiMn_2O_4$), or a ternary system material in which a portion of cobalt is substituted with nickel and manganese ($LiMn_xNi_yCo_{1-x-y}O_2$), and spinel-type lithium manganate ($LiMn_2O_4$), olivine-based (phosphate-based) active materials such as lithium iron phosphate ($LiFePO_4$), metal oxides such as $V_2O_5$, metal compounds such as $TiS_2$, $MoS_2$ and $NbSe_2$, elemental sulfur, and organic positive electrode materials. The negative electrode active material is not particularly limited, and examples of the negative electrode active material include carbon materials such as natural graphite, artificial graphite, and hard carbon; silicon compounds in which SiO, SiC, SiOC or the like is contained as a basic constituent element; elemental silicon; and metal oxides such as manganese oxide (MnO) and cobalt oxide (CoO), which can be reactive with a lithium ion in a conversion manner.

As the conductive agent, only the graphene powder of the present invention may be used, or another conductive agent may further be added. The conductive agent to be further added is not particularly limited, and examples thereof include carbon blacks such as furnace black, ketjen black, and acetylene black; graphites such as natural graphite (scaly graphite and the like), and artificial graphite; conductive fibers such as carbon fibers and metal fibers; and metal powders of copper, nickel, aluminum, silver, or the like.

As the binder, a fluoropolymer such as polyvinylidene fluoride (PVDF) and polytetrafluoroethylene (PTFE), or a rubber such as styrene-butadiene rubber (SBR) and natural rubber can be used.

By mixing these active materials, a conductive agent, and a binder as needed with a solvent in an adequate amount, an electrode paste for a lithium ion battery can be prepared. In addition, by applying the electrode paste to a collector and drying the electrode paste, an electrode for a lithium ion battery can be prepared. As the solvent used herein, N-methyl pyrrolidone, γ-butyrolactone, carboxymethyl cellulose, dimethylacetamide, or the like may be used, and N-methyl pyrrolidone is particularly preferably used.

The technique of mixing an electrode paste for a lithium ion battery is not limited, and a known mixer/kneader can be used. Examples of the known mixer include an automatic mortar, a homogenizer, a planetary mixer, a homodisper, and a rotation-revolution mixer. A planetary mixer can be mentioned as a particularly preferred technique.

In addition, by applying the electrode paste to a collector and drying the electrode paste, an electrode for a lithium ion battery can be prepared. The method for applying the electrode paste to a collector is not particularly limited, and the electrode paste can be applied by using a baker-type applicator, a film applicator with a micrometer, a bar coater, a doctor blade, or the like manually or with an automatic coating machine.

The graphene powder of the present invention has a specific surface area and an oxidation degree each in a specific range, and therefore can be favorably dispersed in an electrode paste solvent. Accordingly, the electrode for a lithium ion battery of the present invention can improve the electron conductivity in the electrode because the graphene powder favorably disperses in the electrode, and an electrode for a lithium ion battery having excellent performance can be provided.

<Production Method of Graphene Powder>

The graphene powder of the present invention can be prepared, as an example, by a production method in which graphene oxide, and a surface treatment agent having an acidic group are mixed in a solvent, and then the graphene oxide is subjected to a reduction treatment. Particles of the graphene having an adequate oxidation degree and containing functional groups in a large amount easily interact with each other, and there is a tendency that the specific surface area is lowered because of the overlapping of the graphene. In particular, a graphene powder having an oxygen-to-carbon element ratio of 0.09 or more to 0.30 or less and a nitrogen-to-carbon element ratio of 0.005 or more to 0.02 or less has a tendency to lower the specific surface area. Accordingly, in order to increase the specific surface area of the graphene having an adequate oxygen ratio and an adequate nitrogen ratio, it is required to perform an exfoliation treatment by shearing, to select an appropriate reduction technique, and to select an appropriate drying technique.

The preparation method of the graphene oxide is not particularly limited, and a known method such as a Hummers' method can be used. Further, graphene oxide available on the market may be purchased. As the preparation method of the graphene oxide, a method in a case of using a Hummers' method is mentioned in the following.

Graphite (black lead powder) and sodium nitrate are put into concentrated sulfuric acid, and into the resultant mixture, potassium permanganate is gradually added with stirring so that the temperature is not raised, and the resultant mixture is stirred and reacted at a temperature of 25 to 50° C. for 0.2 to 5 hours. After that, ion-exchange water is added into the resultant mixture to dilute the mixture, whereby a suspension is obtained. Then, the suspension is reacted at a temperature of 80 to 100° C. for 5 to 50 minutes. Finally, hydrogen peroxide and deionized water are added, and the resultant mixture is reacted for 1 to 30 minutes to give a graphene oxide dispersion. The obtained graphene oxide dispersion is filtrated and washed to give a graphene oxide gel. The graphene oxide gel may be diluted, and then mixed with a surface treatment agent, or subjected to a reduction treatment. Alternatively, by removing the solvent from the graphene oxide gel by freeze drying, spray drying, or the like, a graphene oxide powder is obtained, and then the graphene oxide powder may be dispersed in a solvent and subjected to a treatment. However, when the graphene oxide is dried, particles of the graphene oxide are stacked on each other, and the specific surface area is easily lowered. Therefore, it is preferred that the graphene is prepared without passing through a step of drying the graphene oxide.

The graphite as a raw material of the graphene oxide may be either of artificial graphite and natural graphite, but natural graphite is preferably used. The number of mesh of the graphite as a raw material is preferably 20000 or less, and more preferably 5000 or less.

As an example, the proportion of the reactants is 150 to 300 ml of concentrated sulfuric acid, 2 to 8 g of sodium nitrate, 10 to 40 g of potassium permanganate, and 40 to 80 g of hydrogen peroxide, relative to 10 g of graphite. When sodium nitrate and potassium permanganate are added, the temperature is controlled by utilizing an ice bath. When hydrogen peroxide and deionized water are added, the mass of the deionized water is 10 to 20 times as much as the mass of hydrogen peroxide. As concentrated sulfuric acid, concentrated sulfuric acid having a mass content of 70% or more is preferably used, and concentrated sulfuric acid having a mass content of 97% or more is more preferably used.

The graphene oxide has high dispersibility, but the graphene oxide itself is insulative and cannot be used as a conductive agent or the like. When the oxidation degree of the graphene oxide is extremely high, there may be a case where the electrical conductivity of the graphene powder obtained by reduction is deteriorated. Therefore, the proportion of the carbon atoms to the oxygen atoms in the graphene oxide, which is measured by X-ray photoelectron spectroscopy, is preferably 0.5 or less. At the time of measuring the graphene oxide by X-ray photoelectron spectroscopy, the measurement is performed in a state where the solvent has been sufficiently removed.

In addition, in a case where the graphite is not oxidized to the inside, the graphene powder in a flaky form is hardly obtained when the graphene oxide is reduced. Accordingly, it is desirable for the graphene oxide that a peak specific to a graphite structure is not detected when the dried graphene oxide powder is measured by X-ray diffraction.

The oxidation degree of the graphene oxide can be adjusted by changing the amount of an oxidizing agent to be used for the oxidation reaction of graphite. Specifically, as the amounts of sodium nitrate and potassium permanganate, which are used in the oxidation reaction, are larger relative to the amount of graphite, the oxidation degree is higher, and as the amounts are smaller, the oxidation degree is lower. The weight ratio of sodium nitrate to graphite is not particularly limited, but is preferably 0.20 or more to 0.80 or less, more preferably 0.25 or more to 0.50 or less, and particularly preferably 0.275 or more to 0.425 or less. The ratio of potassium permanganate to graphite is not particularly limited, but is preferably 1.0 or more, more preferably 1.4 or more, and particularly preferably 1.65 or more. Further, the ratio of potassium permanganate to graphite is preferably 4.0 or less, more preferably 3.0 or less, and particularly preferably 2.55 or less.

Next, the graphene oxide is mixed with a surface treatment agent having an acidic group, that is, a hydroxy group, a phenolic hydroxy group, a nitro group, a carboxyl group, or a carbonyl group (hereinafter simply referred to as a "surface treatment agent"). The surface treatment agent is not limited as long as it has an acidic group, and a polymer having an acidic group, a surfactant, and a low-molecular compound can be mentioned.

Examples of the polymer having an acidic group include polyvinyl pyrrolidone, polyvinyl alcohol, and polymethyl vinyl ether. As the surfactant, any of a cationic surfactant, an anionic surfactant, a nonionic surfactant, or the like can be used. Since an anion or a cation itself may be involved in an electrochemical reaction, a nonionic surfactant that is not ionized is suitable from the viewpoint of being used as a battery material. Further, from the viewpoint of enhancing the electrical conductivity of the graphene, a low-molecular compound is preferred as compared to a compound having a high molecular weight, such as a polymer and a surfactant.

As the low-molecular compound, a compound having an aromatic ring is preferred from the viewpoint of the affinity for a surface of the graphene.

As the acidic group possessed by a surface treatment agent, a phenolic hydroxy group is preferred. Examples of the compound having a phenolic hydroxy group include phenol, nitrophenol, cresol, catechol, and a compound having a structure in which a portion of phenol, nitrophenol, cresol, or catechol is substituted. Among them, a compound having a catechol group is preferred because of having adhesiveness to graphene and dispersibility in a solvent. The surface treatment agent may have a basic group in addition to an acidic group, and when the surface treatment agent has, in particular, an amino group, the dispersibility is further improved. A compound having both of a catechol group and an amino group is particularly preferred.

The graphene oxide and a surface treatment agent can be mixed by adding the surface treatment agent into a graphene oxide dispersion, and stirring the resultant mixture. In order to favorably mix the graphene oxide with the surface treatment agent, the graphene oxide and the surface treatment agent are preferably in a state of being dispersed in a solution. In this case, it is preferred that the graphene oxide and the surface treatment agent having an acidic group are both completely dissolved, but part of the graphene oxide and surface treatment agent may be left as a solid without being dissolved. As the solvent, a polar solvent is preferred. The solvent is not particularly limited, and examples of the solvent include water, ethanol, methanol, 1-propanol, 2-propanol, N-methyl pyrrolidone, dimethylformamide, dimethylacetamide, dimethyl sulfoxide, and γ-butyrolactone. By performing the reduction in a state where the surface treatment agent and the graphene oxide are mixed, graphene having a surface treatment agent adhered thereto can be prepared.

In the present invention, the method of a reduction treatment for graphene oxide is not limited. In a case of reduction by heating, carbon dioxide is desorbed from the graphene oxide at the time of the reduction reaction, and therefore, there is a tendency that carbon falls out of the graphene structure and the electrical conductivity is lowered. Further, in a case where the graphene oxide is subjected to heat reduction, the reduction reaction rapidly occurs and exfoliation occurs, and therefore, there is a tendency that the specific surface area becomes extremely large. On the other hand, in the reduction by chemical reduction, the graphene structure is hardly broken as compared to the reduction by heating, and further the reduction reaction occurs moderately. Therefore, the chemical reduction is preferred as the reduction technique. Examples of the reducing agent for chemical reduction include an organic reducing agent and an inorganic reducing agent, and an inorganic reducing agent is preferred because of ease of washing after the reduction.

Examples of the organic reducing agent include an aldehyde-based reducing agent, a hydrazine derivative reducing agent, and an alcohol reducing agent. Among them, an alcohol reducing agent enables relatively gentle reduction, and therefore, it is particularly suitable. Examples of the alcohol reducing agent include methanol, ethanol, propanol, isopropyl alcohol, butanol, benzyl alcohol, phenol, ethanol amine, ethylene glycol, propylene glycol, and diethylene glycol.

Examples of the inorganic reducing agent include sodium dithionite, potassium dithionite, phosphorous acid, sodium borohydride, and hydrazine. Among them, sodium dithionite and potassium dithionite are suitably used because they are capable of performing the reduction while relatively retaining functional groups.

The production method of the graphene powder of the present invention preferably includes a step of dispersing a mixture of a graphene oxide powder or graphene oxide and a surface treatment agent in a dispersion medium, and performing a stirring treatment by a high shear mixer (this step is referred to as a stirring step) at any stage before the above-described reduction treatment. The stirring step may be performed before the mixing of graphene oxide and a surface treatment agent, or may be performed at the same time as the mixing of graphene oxide and a surface treatment agent. That is, graphene oxide and a surface treatment agent may also be mixed by stirring with a high shear mixer. Further, the stirring step may be performed anew after the mixing of graphene oxide and a surface treatment agent. In the stirring step, by performing the exfoliation of graphene oxide with a high shear mixer, the specific surface area can be increased.

The dispersion medium in the stirring step is not particularly limited, but a dispersion medium that dissolves the graphene oxide partly or totally is preferably used. As such a dispersion medium, a polar solvent is preferred, and preferable examples of the dispersion medium include water, ethanol, methanol, 1-propanol, 2-propanol, N-methyl pyrrolidone, dimethylformamide, dimethylacetamide, dimethyl sulfoxide, and γ-butyrolactone. Among them, water has extremely high affinity and solubility for graphene oxide, and is the most preferable solvent.

The shear rate in the stirring step is 10000 per second to 30000 per second. When the shear rate is extremely low, the exfoliation of graphene oxide hardly occurs, and the specific surface area of the graphene powder finally purified is low. On the other hand, when the shear rate is extremely high, the specific surface area of the graphene powder is high. The shear rate is preferably 13000 or more per second, and more preferably 16000 or more per second. Further, the shear rate is preferably 27000 or less per second, and more preferably 24000 or less per second. Moreover, the treatment time of the stirring treatment is preferably 15 seconds to 300 seconds, and more preferably 30 seconds to 60 seconds.

As the high shear mixer used in a stirring step, FILMIX (Registered Trademark) 30-30 Type (manufactured by PRIMIX Corporation) can be mentioned. This high shear mixer has a gap of around 1 mm between the turning part and the wall surface, and is capable of applying high shear force by turning the turning part at high speed.

The graphene obtained by reduction is appropriately washed, and then dried to give a graphene powder. The drying method is not limited, but graphene is aggregated during the drying, and therefore, there may be a case where the specific surface area is lowered. Accordingly, as the drying method for graphene, vacuum drying is preferred, and freeze drying is more preferred, as compared to normal pressure heat drying.

EXAMPLES

Measurement Example 1

Measurement of BET Specific Surface Area

The specific surface area of each sample was measured by using HM Model-1210 (manufactured by Macsorb). As a measurement principle, the measurement was performed by a BET flow method (one-point type, a method described in Z8830: 2013). The degassing condition was set to 100° C.×180 minutes, and the equilibrium relative pressure was set to 0.29.

Measurement Example 2

Measurement of X-ray Photoelectron

The measurement of X-ray photoelectron of each sample was performed by using Quantera SXM (manufactured by Physical Electronics, Inc.). An excited X-ray was monochromatic Al Kα1 and Kα2 lines (1486.6 eV), the X-ray diameter was set to 200 μm, and the photoelectron escape angle was set to 45°.

Measurement Example 3

Raman Measurement

The Raman measurement was performed by using Ramanor T-64000 (manufactured by Jobin Yvon S.A.S./Atago Bussan Co., Ltd.). The beam diameter was set to 100 μm, and an argon ion laser (wavelength: 514.5 nm) was used as a light source.

Measurement Example 4

Measurement of Powder Resistivity

The electrical conductivity of each sample was measured by forming the sample into a disk-shaped test piece having a diameter of around 20 mm and a density of 1 g/cm$^3$, and by using the disk-shaped test piece, with a high resistivity meter: MCP-HT450 and a low resistivity meter: MCP-T610 which are manufactured by Mitsubishi Chemical Corporation.

Measurement Example 5

Measurement of Viscosity Yield Value

The viscosity yield value was measured by using an electrode paste obtained by mixing 1.5 parts by weight of the graphene powder prepared in the following example, 92 parts by weight of $LiMn_2O_4$ as an electrode active material, 1.5 parts by weight of acetylene black as another conductive agent, 5 parts by weight of polyvinylidene fluoride as a binder, and 100 parts by weight of N-methyl pyrrolidone as a solvent with a planetary mixer. The yield value of the electrode paste was measured by using a viscometer (manufactured by RHEOTECH, Model number RC20). The viscosity was measured using a cone plate (C25-2) as a probe in 30 stages at a shear rate of 0 to 500 per second in a temperature condition of 25° C. by increasing the shear rate in stages. The shear rate and the shear stress were plotted by Casson plot, and the yield value was calculated from the intercept.

Measurement Example 6

Battery Performance Evaluation

The discharge capacity was measured as follows except as otherwise described. The electrode paste prepared by the method described in Measurement Example 5 was applied to aluminum foil (having a thickness of 18 μm) by using a doctor blade (300 μm), and subjected to drying at 80° C. for 15 minutes. Then, the aluminum foil with the electrode paste was subjected to vacuum drying to give an electrode plate. By using a piece having a diameter of 15.9 mm cut out from the prepared electrode plate as a positive electrode, a piece having a diameter of 16.1 mm and a thickness of 0.2 mm cut out from lithium foil as a negative electrode, a piece having a diameter of 17 mm cut out from Celgard #2400 (manufactured by Celgard, LLC.) as a separator, and a solvent of ethylene carbonate:diethyl carbonate=7:3 containing 1 M of $LiPF_6$ as an electrolytic solution, a 2042-type coin battery was prepared, and electrochemical evaluation was performed. The charge and discharge measurement was performed 3 times each at a rate of 0.1 C, 1 C, and 5 C in this order, 9 times in total, with an upper limit voltage of 4.3 V and a lower limit voltage of 3.0 V, and the capacity at the time of the third discharge at a rate of 5 C was defined as the discharge capacity.

Synthesis Example 1

Preparation method of graphene oxide: A 1500 mesh natural graphite powder (manufactured by Shanghai Yifan Graphite Co., Ltd.) was used as a raw material. In 10 g of the natural graphite powder in an ice bath, 220 ml of 98% concentrated sulfuric acid, 5 g of sodium nitrate, and 30 g of potassium permanganate were added. The resultant mixture was mechanically stirred for 1 hour, and the temperature of the mixture was kept at 20° C. or lower. This mixture was taken out of the ice bath, and stirred for 4 hours in a water bath at 35° C. to be reacted, and then 500 ml of ion-exchange water was added to the resultant mixture to give a suspension. The suspension was further reacted at 90° C. for 15 minutes. Finally, 600 ml of ion-exchange water and 50 ml of hydrogen peroxide were put into the suspension, and the mixture was reacted for 5 minutes to give a graphene oxide dispersion. The graphene oxide dispersion was filtered while it was hot, and the metal ions were washed with a dilute hydrochloric acid solution. The acid was washed with ion-exchange water, and the washing was repeated until the pH became 7 to prepare a graphene oxide gel. The element composition ratio of oxygen atoms to carbon atoms (O/C ratio) in the prepared graphene oxide gel was 0.53.

Example 1

(1) Preparation method of graphene powder: The graphene oxide gel prepared in Synthesis Example 1 was diluted with ion-exchange water to a concentration of 30 mg/ml, and treated for 30 minutes with an ultrasonic washing machine to give a homogenized graphene oxide dispersion.

The graphene oxide dispersion in a volume of 20 ml was mixed with 0.3 g of dopamine hydrochloride, and the mixture was treated at a rotational speed of 40 m/s (shear rate: 20000 per second) for 60 seconds with FILMIX (Registered Trademark) 30-30 Type (manufactured by PRIMIX Corporation). After the treatment, the graphene oxide dispersion was diluted to a concentration of 5 mg/ml, and 0.3 g of sodium dithionite was put into 20 ml of the dispersion. The resultant mixture was reacted at a reduction reaction temperature of room temperature (40° C.) for a reduction reaction time of 1 hour, filtered, water-washed, and freeze-dried to give a graphene powder.

(2) Properties and Performance of Graphene Powder

The specific surface area of the prepared graphene powder was 180 m$^2$/g as measured in accordance with the procedures in Measurement Example 1. When the measurement of X-ray photoelectron was performed in accordance with the procedures in Measurement Example 2, the element composition ratio of oxygen atoms to carbon atoms (O/C ratio) was 0.12, and the element composition ratio of nitrogen atoms to carbon atoms (N/C ratio) was 0.013. When the prepared graphene powder was measured by Raman spectroscopy in accordance with the procedures in Measurement Example 3, the $I_D/I_G$ ratio was 1.55. The powder resistivity was $4.2 \times 10^{-2}$ Ω·cm as measured in accordance with the procedures in Measurement Example 4.

Further, the viscosity yield value of the electrode paste was 10 Pa as measured in accordance with the procedures in Measurement Example 5. When the battery performance evaluation was performed by using the paste in accordance with the procedures in Measurement Example 6, the discharge capacity was 90 mAh/g.

Examples 2 to 4

The conditions of FILMIX at the time of stirring and/or the concentration of graphene oxide were changed to those described in Table 1.

Example 5

The treatment was performed in the same manner as in Example 1 except that the reducing agent was changed to 0.3 g of hydrazine monohydrate.

Example 6

The treatment was performed in the same manner as in Example 1 except that the reducing agent was changed to 0.3 g of sodium borohydride, and the reduction reaction temperature was changed to 60° C.

Example 7

The treatment was performed in the same manner as in Example 1 except that the drying method of graphene powder was changed from freeze drying to vacuum drying at 80° C. for 6 hours.

Comparative Example 1

The graphene oxide gel prepared in Synthesis Example 1 was dried at 100° C. for 24 hours in a heating furnace. The dried graphene oxide was placed in a quartz tube filled with an argon atmosphere, the quartz tube was rapidly placed in an electric furnace preheated at 1050° C., and kept for 30 seconds in the furnace. By this technique, an expanded and exfoliated graphene powder was obtained. The prepared graphene powder was evaluated in the same manner as in Example 1.

Comparative Example 2

The graphene oxide gel prepared in Synthesis Example 1 was dried at 100° C. for 24 hours in a heating furnace to give a graphene oxide powder. The dried graphene oxide powder was dispersed in NMP so as to be 30 mg/ml, and 100 parts by weight of the dispersion was mixed with 92 parts by weight of $LiMn_2O_4$ as an electrode active material by a planetary mixer. Further, in the resultant mixture, 1.5 parts by weight of acetylene black as a conductive agent and 5 parts by weight of polyvinylidene fluoride as a binder were added and mixed by a planetary mixer to give an electrode paste. The electrode paste was applied to aluminum foil (having a thickness of 18 μm) by using a doctor blade (300 μm), and dried at 170° C. for 5 hours and then heated at 200° C. for 20 hours in a reducing atmosphere to give an electrode plate. In the drying and heating steps of the electrode, graphene oxide was reduced at the same time, and a graphene powder was generated. When the electrode plate was measured in accordance with the procedures in Measurement Example 6, the discharge capacity was 15 mAh/g.

The electrode components were exfoliated from the electrode plate, PVDF was washed away by using NMP, the electrode active material was dissolved with an acid, and the resultant product was dried and a graphene powder was taken out. This graphene powder was evaluated in the same manner as in Example 1.

Comparative Example 3

The graphene oxide gel prepared in Synthesis Example 1 was diluted with ion-exchange water to a concentration of 5 mg/ml, and treated in an ultrasonic bath to give a homogeneously dispersed graphene oxide dispersion. In 200 ml of the graphene oxide dispersion, 0.5 g of dopamine hydrochloride and 3 g of sodium dithionite as a reducing agent were placed. The resultant mixture was reacted at a reduction reaction temperature of 40° C. for a reduction reaction time of 30 minutes using a mechanical stirrer. A process in which the obtained graphene dispersion is filtered, the filtered material is dispersed again in 100 ml of water, and the dispersion is filtered was repeated twice, and the filtered material was washed. After the washing, the resultant product was subjected to vacuum drying at 120° C. for 2 hours to give a graphene powder. The prepared graphene powder was evaluated in the same manner as in Example 1.

Comparative Example 4

The treatment was performed in the same manner as in Example 1 except that the drying method of graphene powder was changed from freeze drying to drying at 100° C. and normal pressure for 6 hours.

The preparation conditions of the graphene powder in examples and comparative examples as described above, and various evaluation results of the obtained graphene are shown in Table 1.

TABLE 1

| | Preparation of graphene oxide dispersion | | Stirring step | | | Reduction step | | | | | Graphene evaluation | | | | | | |
|---|---|---|---|---|---|---|---|---|---|---|---|---|---|---|---|---|---|
| | Diluent | Graphene oxide concentration | Volume | Dispersant | Stirring conditions | Graphene oxide concentration | Reducing agent | Reaction temperature | Reaction time | Drying step | Specific Surface area ($m^2/g$) | O/C ratio | N/C ratio | Raman $I_D/I_G$ | Powder resistivity ($\Omega \times cm$) | Discharge capacity (mAh/g) | Yield value |
| Example 1 | Ion-exchange water | 30 mg/mL | 20 ml | Dopamine hydrochloride 0.3 g | FILMIX Rotational speed 40 m/s Treatment time 60 s | 5 mg/mL | Sodium dithionite 0.3 g | 40° C. | 1 hour | Freeze drying | 180 | 0.12 | 0.013 | 1.55 | 0.042 | 90 | 10 Pa |
| Example 2 | Ion-exchange water | 30 mg/mL | 20 ml | Dopamine hydrochloride 0.3 g | FILMIX Rotational speed 40 m/s Treatment time 30 s | 5 mg/mL | Sodium dithionite 0.3 g | 40° C. | 1 hour | Freeze drying | 158 | 0.12 | 0.013 | 1.54 | 0.043 | 87 | 8 Pa |
| Example 3 | Ion-exchange water | 30 mg/mL | 20 ml | Dopamine hydrochloride 0.3 g | FILMIX Rotational speed 30 m/s Treatment time 60 s | 5 mg/mL | Sodium dithionite 0.3 g | 40° C. | 1 hour | Freeze drying | 135 | 0.12 | 0.013 | 1.55 | 0.042 | 88 | 7 Pa |
| Example 4 | Ion-exchange water | 10 mg/mL | 20 ml | Dopamine hydrochloride 0.3 g | FILMIX Rotational speed 40 m/s Treatment time 60 s | 5 mg/mL | Sodium dithionite 0.3 g | 40° C. | 1 hour | Freeze drying | 114 | 0.12 | 0.013 | 1.54 | 0.045 | 85 | 7 Pa |
| Example 5 | Ion-exchange water | 30 mg/mL | 20 ml | Dopamine hydrochloride 0.1 g | FILMIX Rotational speed 40 m/s Treatment time 60 s | 5 mg/mL | Sodium dithionite 0.3 g | 40° C. | 1 hour | Freeze drying | 176 | 0.10 | 0.012 | 1.41 | 0.034 | 82 | 8 Pa |
| Example 6 | Ion-exchange water | 30 mg/mL | 20 ml | Dopamine hydrochloride 0.3 g | FILMIX Rotational speed 40 m/s Treatment time 60 s | 5 mg/mL | Sodium dithionite 0.3 g | 40° C. | 1 hour | Freeze drying | 172 | 0.13 | 0.011 | 1.79 | 0.046 | 83 | 7 Pa |
| Example 7 | Ion-exchange water (+dilution after drying) | 30 mg/mL | 20 ml | Dopamine hydrochloride 0.3 g | FILMIX Rotational speed 40 m/s Treatment time 60 s | 5 mg/mL | Sodium dithionite 0.3 g | 40° C. | 1 hour | Freeze drying | 90 | 0.12 | 0.007 | 1.21 | 0.038 | 74 | 5 Pa |
| Example 1 | Ion-exchange water | 30 mg/mL | 20 ml | Dopamine hydrochloride 0.3 g | FILMIX Rotational speed 40 m/s Treatment time 60 s | 5 mg/mL | Sodium dithionite 0.3 g | 40° C. | 1 hour | Vacuum drying | 106 | 0.12 | 0.015 | 1.52 | 0.041 | 76 | 7 Pa |

TABLE 1-continued

| | Preparation of graphene oxide dispersion | | | Stirring step | | | Reduction step | | | | | Graphene evaluation | | | | | | |
|---|---|---|---|---|---|---|---|---|---|---|---|---|---|---|---|---|---|---|
| | Diluent | Graphene oxide concentration | Volume | Dispersant | Stirring conditions | Graphene oxide concentration | Reducing agent | Reaction temperature | Reaction time | Drying step | Specific Surface area (m²/g) | O/C ratio | N/C ratio | Raman $I_D/I_G$ | Powder resistivity (Ω × cm) | Discharge capacity (mAh/g) | Yield value |
| Comparative Example 1 | Dried Powder | | | — | | — | Reduction by thermal expansion | | | | 1500 | 0.07 | 0 | 0.81 | 0.21 | 12 | 56 Pa |
| Comparative Example 2 | NMP | 30 mg/mL | | — | | — | Heating reduction | | | | 450 | 0.07 | 0 | 0.82 | 0.23 | 15 | 42 Pa |
| Comparative Example 3 | Ion-exchange water | 5 mg/mL | 200 ml | Dopamine hydrochloride 0.5 g | Stirrer stirring | 5 mg/mL | Sodium dithionite 3 g | 40° C. | 30 min | Freeze drying | 68 | 0.12 | 0.011 | 1.45 | 0.043 | 31 | 7 Pa |
| Comparative Example 4 | Ion-exchange water | 30 mg/mL | 20 ml | Dopamine hydrochloride 0.3 g | FILMIX Rotational speed 40 m/s Treatment time 60 s | 5 mg/mL | Sodium dithionite 0.3 g | 40° C. | 1 hour | Heat drying 100° C. 6 hours | 42 | 0.12 | 0.013 | 1.43 | 0.042 | 21 | 6 Pa |

The invention claimed is:

1. A graphene powder, having a specific surface area of 80 m$^2$/g or more to 250 m$^2$/g or less as measured by BET measurement, and an oxygen-to-carbon element ratio (O/C ratio) of 0.09 or more to 0.30 or less as measured by X-ray photoelectron spectroscopy.

2. The graphene powder according to claim 1, wherein a nitrogen-to-carbon element ratio (N/C ratio) as measured by X-ray photoelectron spectroscopy is 0.005 or more to 0.02 or less.

3. The graphene powder according to claim 1, wherein a ratio of peak intensity $I_D$ to peak intensity $I_G$ ($I_D/I_G$ ratio) as measured by Raman spectroscopy is 1 or more to 2 or less.

4. The graphene powder according to claim 1, having a powder resistivity of $10^{-3}$ Ω·cm or more to $10^{-1}$ Ω·cm or less.

5. The graphene powder according to claim 1, wherein the O/C ratio is 0.09 or more to 0.20 or less.

6. The graphene powder according to claim 5, wherein the O/C ratio is 0.09 or more to 0.15 or less.

7. The graphene powder according to claim 6, wherein the specific surface area is 100 m$^2$/g or more to 200 m$^2$/g or less.

8. The graphene powder according to claim 5, wherein the specific surface area is 100 m$^2$/g or more to 200 m$^2$/g or less.

9. The graphene powder according to claim 1, wherein the specific surface area is 100 m$^2$/g or more to 200 m$^2$/g or less.

10. An electrode paste for a lithium ion battery, comprising: the graphene powder according to claim 1, an electrode active material, and a binder.

11. An electrode for a lithium ion battery, comprising the graphene powder according to claim 1.

* * * * *